Patented June 2, 1931

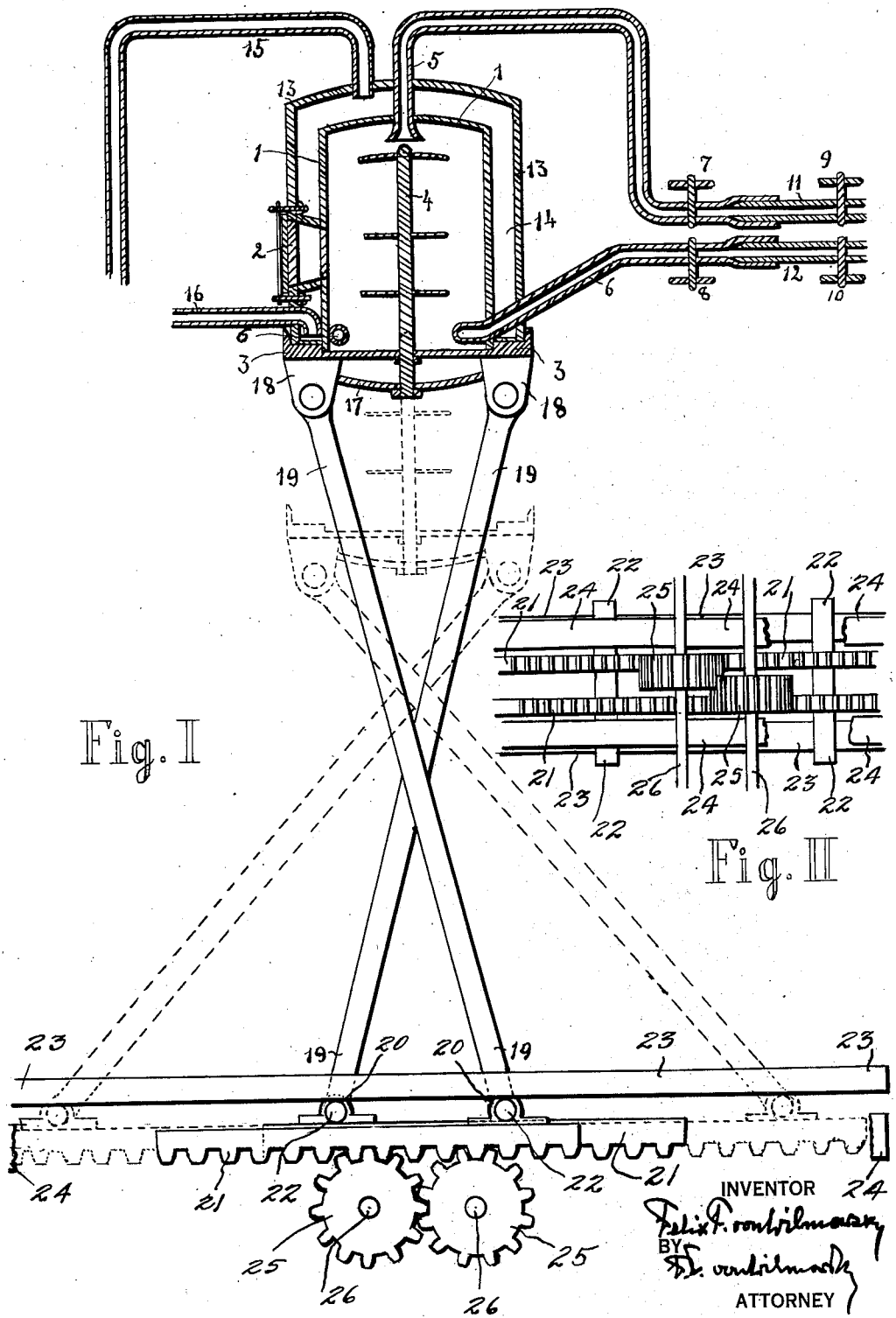

1,808,191

UNITED STATES PATENT OFFICE

FELIX F. von WILMOWSKY, OF NEW YORK, N. Y.

ART OF TREATING GUM HYDROCARBONS AND APPARATUS USED IN THE SAID ART

Continuation of application Serial No. 701,217, filed March 22, 1924. This application filed February 8, 1930. Serial No. 427,069.

My inventions here continued to be claimed and which were first claimed by me in the patent application filed on March 22, 1924, Serial Number 701,217, relate to the hydrocarbon gums generally, and, among the same, in particular to such gum hydrocarbons as the hydrocarbons which are characteristic of the Sapotacea gums. By Sapotacea gums I understand a certain group of the elastic gums which is obtained from certain plants, chiefly of the family of Sapotaceæ; some Sapotaceæ yield guttapercha; some yield chicle; some balata. Whereas the purified caoutchoucs of the better grades are constituted of hydrocarbon gums and a low percentage of resin, the purified Sapotacea gums are constituted of hydrocarbon gums and, e. g., prime red guttapercha, pure, about 20 per cent. of resin; balata, about 50 per cent.; chicle, about 60 to 70 per cent. of resin; their hydrocarbons being of a character and physical properties different from those of the caoutchouc gum hydrocarbons but related in certain respects as is herein below set forth. I have found that such gum hydrocarbons as make up the hydrocarbon gums which are characteristic of the Sapotacea gums, when pure and substantially without an admixture of the resin of the elastic gums, can be cured or combined with curing agents such as sulphur "in statu nascendi", that is to say, under circumstances where the curing agent is in an active state or condition, or when the mixture of such hydrocarbon gum substantially free of resin and the curing agent is subjected to the action of suitable heat or vulcanized, like the best grade of caoutchouc; they yield articles of manufacture of new and for the industrial arts valuable properties.

My method of treating the gum hydrocarbons is as follows:

If my raw material is a resinous elastic gum, purified, a preliminary step consists in breaking the same up by separating the resin and the hydrocarbon gum. I do this by some one of the resin-removing processes heretofore known. My first step, applied to the solid or coagulated gum hydrocarbons, consists in dissolving the same in a not-oxidizing solvent such as suitably volatile petroleum hydrocarbons of suitable temperature. Such hydrocarbon gums as those characteristic of the less tenacious Sapotacea gums dissolve in petroleum hydrocarbons at temperatures below the temperatures required for the hydrocarbon gums of guttapercha. Some of the gum hydrocarbons dissolve at very much lower temperatures; I prefer to employ the lowest practical temperature at which the particular gum hydracarbon is soluble with an ample allowance of time. The solution, sufficiently diluted, is kept at a temperature suitably high for remaining fluid until it clears. The cleared solution, suitably concentrated by evaporating, is ready for curing.

My second step consists in differentiating the gum hydrocarbons. The cleared solution of hydrocarbon gum is kept at a suitably low temperature until precipitation of some gum hydrocarbon commences. The temperature at which the bulk of such gum hydrocarbons as those characteristic of balata are precipitated from petroleum within a day or two is about 16 degrees centigrade. For such gum hydrocarbons as require a low temperature for precipitation I use petroleum hydrocarbons such as rhigolene, which is a mixture of petroleum hydrocarbons of 100 to 90 degrees Baumé and of 0.600 to 0.650 specific gravity and I apply suitable refrigeration. I have found that the gum hydrocarbons which precipitate from the solution in petroleum hydrocarbons at different times have different physical properties, the first portion being the most tenacious part when compacted. I have further found that the hydrocarbon gums can be differentiated into different grades or lots of gum hydrocarbons by lowering the temperature of, and also by lowering the pressure upon, the solution gradually. I therefore remove the precipitated gum hydrocarbons with suitable intervals of time; and I preferably combine with this method the gradual lowering of the temperature of and of the pressure upon the solution; the intervals of time and the temperatures and pressures depend on the character of the gum hydrocarbons dealt with. Thus, by gradually changing the physical conditions under which the dissolved hydrocarbon gum, washed with warm water while in solution, after cooling precipitates and by fractional removal of the precipitated gum hydrocarbons, I have obtained from balata some gum hydrocarbons that, compacted, were equal in hardness and tenacity to the compacted precipitated hydrocarbon gum obtained from prime red gutta-percha. In a similar manner I separate from each other the several grades or lots of gum hydrocarbons by utilizing or employing gradually changing physical factors (running time; gradually increasing temperature; gradually increasing pressure) which govern the dissolution of the solid gum hydrocarbons. I dissolve the compact hydrocarbon gum thinly sheeted with a fair allowance of time in suitably volatile petroleum hydrocarbons at different successively raised temperatures, carefully graded according to the character of the gum hydrocarbons to be dealt with, and preferably combining with this a gradually increased pressure, and I remove the extract at the end of every shift, then introducing new solvent and raising anew suitably the temperature and once more increasing the pressure. The regulating of the temperature for fractionated or gradual extraction or precipitation of the different grades or lots of the gum hydrocarbons is done preferably by changing the warming or cooling or refrigerating source within or around the jacketed digester which contains the gum hydrocarbons. I employ in all cases herein as volatile a fluid, preferably petroleum hydrocarbons, and as low a temperature as is compatible with the process.

If the solution of the gum hydrocarbons contains substances which remain suspended in the solution, I add some anaerated water of suitable temperature and agitate the liquid; this will cause impurities generally to settle. I have found that the gum hydrocarbons have also been affected by the water; different grades or lots of the gum hydrocarbons absorb different proportions of water, this affects the time of their precipitation from the liquor. As has been said above, I have utilized also this difference in the behaviour of various gum hydrocarbons for dividing the hydrocarbon gums into physically distinct grades or lots and, by separating the less tenacious gum hydrocarbons from those of superior tenacity, for the treatment of the hydrocarbon gums generally. There are apparently various ways of segregating physically distinct grades or lots of the gum hydrocarbons. I have found that every repetition of the dissolution of gum hydrocarbons alters the solubility of the same and lengthens the time required for the precipitation of a part of the gum hydrocarbons.

The new articles of manufacture produced by the fractionated extraction and precipitation or solidification of such gum hydrocarbons as the hydrocarbons characteristic of the Sapotacea gums are, are compounds of hydrogen and carbon; they are solid at ordinary temperatures, colourless when pure, and sensitive to the combined action of light and the oxygen of the air; one extreme member of the series is very tenacious, the other extreme least so in comparison; such gum hydrocarbons as the hydrocarbons characteristic of the Sapotacea gums are, are, pure, of hornlike or waxlike visual appearance in the cold; the one extreme lot of such hydrocarbons is springy and horn-like when compacted and precipitates from petroleum hydrocarbons in a coarsely granular form; the other extreme lot is waxlike and precipitates from refrigerated petroleum hydrocarbons finely divided. The gum hydrocarbons obtained by fractionation as herein described turn glasslike pellucid when being heated, but become opaque though in thin layers translucent again while cooling; all, after kneading, are more or less tenacious at ordinary low temperatures; their tenacity distinguishes them, in particular, from the paraffin hydrocarbons. Each distinct grade or lot of the gum hydrocarbons, when chemically pure, has its definite dissolving point and precipitating point for petroleum hydrocarbons, and the same is lower for each less tenacious member of the same series; however, every dissolution changes the percentage of the several grades or lots in a hydrocarbon gum.

I use my methods of fractionated extraction and fractionated precipitation of the gum hydrocarbons not only for the segregation of physically distinct grades or lots, but also for producing new compositions of gum hydrocarbons by mixing together and compounding suitable proportions of the physically distinct grades or lots of gum hydrocarbons with suitable proportions of other gum hydrocarbons or of the elastic gums, so as to obtain a hydrocarbon gum composition or an elastic gum composition of definite prescribed physical properties at will; and further, for making new compositions of the gum hydrocarbons with other and foreign substances. The physical properties of such new artificial hydrocarbon gums and elastic gums are intermediate to the distinct grades or lots of gum hydrocarbons employed.

My third step consists in the curing of the gum hydrocarbons. I knead or mix the gum hydrocarbon substantially free of resin under exclusion of light and of oxidizing agents with one or two per cent. of sulphur in a very finely divided, preferably molecular or atomic state, so as to obtain an entirely homogeneous mixture or a solution of gum hydrocarbons and pure or combined sulphur. The mixture is subjected to the suitably prolonged action of suitable heat; about 60 degrees centigrade suffices in some cases if the gum hydrocarbons are cured with "nascent" or active sulphur; and, for mild-vulcanizing with flowers of sulphur, not higher than 145 and preferably not higher than approximately 130 degrees centigrade.

My preferred form of vulcanizer allows the treatment of the gum hydrocarbons to be carried out in an inert gas under suitably high or low pressure; it is a vessel or container, preferably round and vertically elongated so that it forms either a deep well or a high hood, and which can be closed at one end gas tight for the regulation of the pressure; two orifices for gas pipes are located so that a current of compressed gas can be passed through the closed vessel. The terminal cover can be moved from and to the opening by some suitable mechanism without any vibration; a strong double or scissorlike lever moving along a straight line will serve well. If the gas or vapour to be introduced is heavier than the air, the terminal opening is at the top; if lighter, it is at the bottom of the container. Around the container is a temperature-adjusting device, such as electric wires for heating or a jacket for a bath; or a coil of pipes, so as to maintain the interior of the container at will at a certain temperature. The container is preferably of iron sufficiently strong in all of its parts to withstand as high a pressure as may be required for the treatment or process involved. The container is provided with the usual vulcanizing appliances, self-recording thermometer and pressure- and heat-controlling apparatus and safety valve. A stirring mechanism is controlled through a central rod in the end piece of the container. In the accompanying drawing Figure I shows the vertical section of a vulcanizer which is to be opened at the bottom; the position of the opening and closing mechanism shown in continuous lines is the one which the mechanism has while the container is closed; its position while the bottom plate is lowered is shown in dotted lines.

Figure II is a plan as viewed from below, of the mechanism which moves the feet of the shank-levers of the bottom piece scissor-like along a straight line, thereby opening and closing the container.

In the drawing, 1 denotes the walls and ceiling of the container; 2, the lateral door for ready access; 3, the movable bottom plate; 4, the pole fixed in the centre of plate 3, with two shelves; 5 and 6 denote the top and bottom terminals of tubes for compressed gas, the bottom terminal 6 forming a ring-shaped tube perforated with numerous small openings; 7 and 8, 9 and 10 denote stop cocks for turning on and off the gas; 11 and 12 denote the outer terminals of the tubes 5 and 6; they are fitted interchangeably to the terminals of the tubes 11 and 12; through 11 the gas enters, through 12 it is carried off; the tubes 11 and 12 have flexible portions (not shown), so that 11 as well as 12 may be fitted either to 5 or to 6 and the gas may thus enter either at the top or at the bottom. 13 denotes the outer shell; 14, the space for an oil-bath; 15 and 16 denote the tubes leading from and back to the reservoir of the temperature-imparting fluid; 17 denotes the outer shell of the bottom. 18, 18 denote ears or flanges fixed in the bottom plates 17 and 3; 19, 19 the shank-levers hinged to the flanges 18, 18 and to their feet marked 20, 20, by means of which the bottom plate 3 is moved. The feet, marked 20, 20, of the shanks 19, 19 are each held in short sleeves fixed on the back of a rack marked 21, 21; the feet 20, 20 terminate laterally in cylindrical bars, marked 22, 22; these cylinders or rods 22, 22 are confined on either side between an upper and a lower horizontal steel rail, marked 23, 23 and 24, 24; between these rails the rods 22, 22 can glide to and fro, but only along a horizontal straight line; the seats of the rods 22, 22 on the backs of their respective racks 21, 21 are raised so that one rack can pass freely one way or the other below the rod of the other rack. 25, 25 denote two thick toothed wheels of equal size; the two wheels are in mesh with each other; besides, one of the wheels is in mesh with one of the racks 21, 21, the other wheel is in mesh with the other rack; the position of the two wheels 25, 25 with regard to each other is shown in the Figure II; the wheels 25, 25 are turned synchronously by power applied to their axles 26, 26 or to one of the same.

With certain modifications made necessary by the different physical properties of such gum hydrocarbons as those characteristic of the Sapotacea gums are, the same are amenable generally to the known sulphurizing and vulcanizing and curing methods used heretofore with Pará caoutchouc, such as combining the gum hydrocarbons with sulphur "in statu nascendi", under circumstances where the sulphur is "active", or sulphurizing the gum hydrocarbons in solution; the resulting articles of manufacture, however, when mildly sulphurized or vulcanized—that is to say, combined with no more than a few per cent. of the curing agent—have physical properties which differ from those of the articles of mildly cured caoutchouc hydrocarbons.

A preferred curing method is as follows. The gum hydrocarbons when substantially free of resin get cured when they are impregnated or well mixed at a low temperature under exclusion of light with pentasulphide of hydrogen—at 0 degree centigrade an oily fluid soluble in benzole—either pure or, if much more combined sulphur than herein above mentioned as preferred for mild-curing, one or two per cent., is desired, with sulphur and monosulphide of hydrogen dissolved in it, upon gradually heating the mixture or solution in a current of carbonic acid gas to about 60 degrees centigrade; the rising temperature gradually decomposes the pentasulphide and the cured gum hydrocarbons, if in solution, congeal or coalesce; if not sufficient pressure is applied to a more concentrated or more strongly sulphurized solution or emulsion of the same, they coagulate; if strongly cured, the gum hydrocarbons precipitate no longer in a crystal-like form, but solidify amorphous. In computing the sulphur to be combined, it must be taken into account that the monosulphide is formed out of the pentasulphide and that the monosulphide likewise decomposes slowly. The rapidity of the curing of the gum hydrocarbons with sulphur differs with the pressure and with the concentration of their solution or emulsion for the various distinct grades or lots and the degree of curing desired; it must be determined by testing samples.

I have found that as long as only so much sulphur is combined with the gum hydrocarbons that it amounts to about one half to three quarters of one per cent. by weight and no free or uncombined sulphur is present, the cured gum hydrocarbons, solid or dissolved, are colourless; if free or uncombined sulphur or a substantially higher percentage of combined sulphur is present, it causes a yellowish or brownish colouring of the product.

Such gum hydrocarbons as the hydrocarbons characteristic of the Sapotacea gums are, when mildly cured—for instance, in a solution by heating with sulphur and applying a chemical or physical factor which turns the sulphur into "active" sulphur and then solidified—become permanently glasslike and pellucid and show greater tenacity and less fusibility than the uncured article; they are characterized by inertness to chemically active light and the oxygen of the air. The more tenacious grades or lots of such gum hydrocarbons when cured in a solid state with curing agents such as "active" or free or combined sulphur in slight proportions, alone and also when mixed with caoutchouc gum hydrocarbons, yield new and useful articles of manufacture; those made of such cured gum hydrocarbons heated to a temperature of about 130 degrees centigrade are glass-like pellucid or transparent in thin layers and are distinguished by smoothness and shininess much greater than those made of the uncured gum hydrocarbons; great tenacity and springiness in thin layers at ordinary and low temperatures and inertness in thin layers are other new properties of the mildly cured gum hydrocarbons referred to. If the uncombined sulphur is present, or a substantially higher percentage of combined sulphur than has been specified, viz., one half to three quarters of one per cent., it imparts to the cured hydrocarbons a light yellow or brown colouring.

I do not limit myself in any way to the treatment of the gum hydrocarbons which are obtained from the commercial elastic gums or are produced from a latex or an extract of vegetable matter; but I consider, for the purposes of the differentiating and other treating methods herein above described, of the curing and the vulcanizing of the differentiated or graded or compounded gum hydrocarbons, an equivalent of the hydrocarbon gums any other gum hydrocarbons produced by metabolism or synthetically or artifically which, when compounded with suitable resin, have the nature of the elastic gums and which have the property characteristic of the gum hydrocarbons of becoming tenacious when kneaded and of being amenable to the fractionating and differentiating and curing methods herein above specified.

I claim:

1. The process of dividing such gum hydrocarbons as the hydrocarbons characteristic of the Sapotacea gums are into distinct grades or lots of gum hydrocarbons having different physical properties such as different degrees of tenacity, which consists in differentiating the aggregate state or physical condition of some portion of such gum hydrocarbons from the aggregate state or physical condition of another portion of the gum hydrocarbons and then separating the differentiated portion of the gum hydrocarbons and the other portion of the gum hydrocarbons from each other.

2. The process of dividing such gum hydrocarbons as the hydrocarbons characteristic of the Sapotacea gums are into distinct grades or lots of gum hydrocarbons having different physical properties such as different degrees of tenacity, which consists in differentiating the aggregate state or physical condition of some portion of such gum hydrocarbons from the aggregate state or physical condition of another portion of the gum hydrocarbons by precipitating the gum hydrocarbons in some manner affecting some portion of the gum hydrocarbons differently from another portion of the gum hydrocarbons and then separating the differentiated portion of the gum hydrocarbons and the other portion of the gum hydrocarbons from each other.

3. The process of dividing such gum hydrocarbons as the hydrocarbons characteristic of the Sapotacea gums are into distinct grades or lots of hydrocarbons having different physical properties such as different degrees of tenacity, which consists in differentiating the aggregate state or physical condition of some portion of such gum hydrocarbons from the aggregate state or physical condition of another portion of the gum hydrocarbons by dissolving the gum hydrocarbons in some manner affecting the aggregate state or physical condition of some portion of the gum hydrocarbons differently from another portion of the gum hydrocarbons, and then separating the differentiated portion of the gum hydrocarbons and the other portion of the gum hydrocarbons from each other.

4. A process of dividing gum hydrocarbons into distinct grades or lots of hydrocarbons having different physical properties such as different degrees of tenacity, which consists in differentiating the aggregate state or physical condition of some portion of such hydrocarbons from the aggregate state or physical condition of another portion of the hydrocarbons by means of employing suitable physical factors which govern the changes of the aggregate states or physical conditions of the gum hydrocarbons and differently affect the aggregate states or physical conditions of distinct portions of the same such as running time, gradually changing temperature, gradually changing pressure; and then separating the differentiated portion and the other portion of the gum hydrocarbons from each other.

5. A process of dividing gum hydrocarbons into distinct grades or lots of hydrocarbons having different physical properties such as different degrees of tenacity, which consists in (1) dissolving the gum hydrocarbons in a suitable solvent such as heated volatile petroleum; (2) differentiating several grades or lots of the gum hydrocarbons by means of their differing affinity for water; (3) gradually precipitating the several grades or lots of the gum hydrocarbons differentiated by suitably lowering the temperature of the solution; (4) separating the several grades or lots of the gum hydrocarbons as they precipitate from the solution gradually one after the other.

6. A process of compounding several distinct grades or lots of gum hydrocarbons which differ by their degrees of tenacity and otherwise, into novel blends of gum hydrocarbons having certain physical properties intermediate to those of the separate grades or lots forming the composition, which consists in (1) differentiating the aggregate states or physical conditions of different portions of the gum hydrocarbons of the Sapotacea gum series and separating the differentiated portions from each other; and (2) mixing certain selected grades or lots of gum hydrocarbons in certain proportions together.

7. The process of combining a certain distinct grade or lot produced by differentiation of such gum hydrocarbons as the hydrocarbons characteristic of the Sapotacea gums are with caoutchouc into novel blends of elastic gum, which consists in differentiating the aggregate state of a portion of the first said gum hydrocarbons from another portion of the same and separating the differentated portion and the other portion from each other; and (2) then mixing one of the said portions of the first said gum hydrocarbons together with caoutchouc.

8. The process of mild-curing such gum hydrocarbons as the hydrocarbons characteristic of the Sapotacea gums are, which consists in exposing such gum hydrocarbons to the action of a mild-curing agent such as a low precentage of sulphur, active; and then keeping said hydrocarbons under the influence of the curing agent at a suitable temperature until the hydrocarbons and the curing agent have combined.

9. The process of treating gum hydrocarbons which consists in (1) dissolving the gum hydrocarbons in a suitable solvent such as warmed or heated volatile petroleum; (2) gradually precipitating the gum hydrocarbons by means of gradually changing physical factors such as running time and gradual lowering of the temperature of the solution and removing the gum hydrocarbon portions as they gradually precipitate one after the other and preferably selecting and compounding some of the separated grades or lots of gum hydrocarbons in certain proportions; and (3) curing or vulcanizing the gum hydrocarbons, substantially as described.

10. A process of curing gum hydrocarbons, which consists in bringing at a suitably low temperature the gum hydrocarbons together with pentasulphide of hydrogen and then curing the gum hydrocarbons at a temperature below the boiling point of sulphur by gradually raising the temperature of the mixture.

11. The new articles of manufacture which consist of combinations of hydrogen and carbon and form physically distinct grades or lots of chemically in substance equivalent gum hydrocarbons, characterized when compact below their softening temperature, some lots by a hornlike, other lots by a waxlike appearance and by tenacity after kneading, the degrees of tenacity differing in the several distinct grades or lots; all grades or lots being colourless when pure; glasslike pellucid when softened by heat to the point of coalescing, but becoming opaque again when cooling; soluble in petroleum hydrcarbons of some higher temperature and precipitating from the chilled or refrigerated petroleum hydrocarbon solution in a solid state, the several grades or lots dissolving and precipitating at fixed times and temperatures different for each lot.

12. The new compositions of matter which are prepared by mixing together in certain proportions several differentiated and isolated grades or lots of gum hydrocarbons; colourless when pure; glasslike pellucid when softened to the point of coalescence by heat, but becoming opaque again when cooling; characterized by the gum hydrocarbons dissolving in hot volatile petroleum hydrocarbons and precipitating from the cooled or refrigerated petroleum solution in a granular or crystal-like solid form.

13. The articles of manufacture which consist of combinations of the gum hydrocarbons with a slight percentage of a mild-curing agent such as approximately one half to three quarters of one per cent., by weight, of sulphur, and which are characterized by being colourless when pure.

14. The new articles of manufacture which consist of gum hydrocarbons cured with a curing agent such as sulphur or mildly vulcanized and which are characterized, when compacted, by being stable and inert or indifferent to oxygen and light combined; in a solid state becoming glasslike pellucid when softened by heat and after coalescence retaining their glasslike appearance when cooled; colourless when pure and containing a slight proportion of the curing agent, say, about three quarters of one per cent., by weight, of sulphur; characterized further by increased tenacity when compact in comparison with the uncured or unvulcanized gum hydrocarbons of like type.

15. An apparatus for vulcanizing elastic gums with exclusion of light and under the pressure of an inert gas such as hydrogen or carbonic acid, which consists of a vertically elongated container sufficiently strong for withstanding the pressures suitable for vulcanization; with an opening at one end, which can be closed gastight by a cover; the cover being movable in a vertical direction and having fixed in it a rod or column which extends into the container when the cover is put on, and which, carries shelves; the container is provided with two orifices into which pipes can be inserted for introducing gas under pressure into the container, and which are located so that a current of the gas suitably heated and suitably compressed can be passed through the container when the latter is closed; the container is combined with a heating device whose temperature can be regulated and adjusted so as to maintain the interior of the container at a certain temperature.

FELIX F. von WILMOWSKY.